United States Patent [19]
Ito et al.

[11] Patent Number: 5,719,985
[45] Date of Patent: Feb. 17, 1998

[54] APPARATUS FOR SIMULTANEOUSLY RECORDING AND REPRODUCING DATA TO AND FROM A RECORDING MEDIUM

[75] Inventors: Norikazu Ito; Satoshi Yutani; Satoshi Yoneya, all of Kanagawa, Japan

[73] Assignee: Sony Corporation, Tokyo, Japan

[21] Appl. No.: 500,955

[22] PCT Filed: Dec. 22, 1994

[86] PCT No.: PCT/JP94/02195

§ 371 Date: Aug. 23, 1995

§ 102(e) Date: Aug. 23, 1995

[87] PCT Pub. No.: WO95/18447

PCT Pub. Date: Jun. 7, 1995

[30] Foreign Application Priority Data

Dec. 24, 1993 [JP] Japan .................. 5-328349
May 27, 1994 [JP] Japan .................. 6-115067

[51] Int. Cl.$^6$ .............. H04N 5/781; H04N 5/92
[52] U.S. Cl. .............. 386/109; 386/122; 386/125; 369/32
[58] Field of Search .................. 386/33, 36, 45, 386/109, 111–112, 122, 125–126; 348/7, 13; 369/32, 49, 54, 60; 360/22–23; H04N 5/76, 5/781, 5/92, 9/79

[56] References Cited

U.S. PATENT DOCUMENTS 5,032,927  7/1991  Watanabe et al. .............. 386/109
5,371,602  12/1994  Tsuboi et al. ................. 386/111

FOREIGN PATENT DOCUMENTS 5-151758  6/1993  Japan .
6-295533  4/1994  Japan .

*Primary Examiner*—Thai Tran
*Attorney, Agent, or Firm*—William S. Frommer; Alvin Sinderbrand

[57] ABSTRACT

A data compressing unit compresses information data inputted from an input unit. An input buffer unit temporarily stores the compressed data obtained by the data compressing unit. A recording/reproducing unit records the compressed data read out from the input buffer unit onto a recording medium, and reproduces the compressed data recorded on the recording medium. An output buffer unit temporarily stores the compressed data reproduced by the recording/reproducing unit. A data expanding unit expands the compressed data read out from the output buffer unit. An output unit outputs data expanded by the expanding unit. For this reason, when one set or cluster of information data is assumed to be information data file, it is possible to reproduce, without necessity of interruption of recording of the entirety of the information data file, the portion recorded earlier, e.g., by several minutes to several tens minutes within the same information data file.

14 Claims, 11 Drawing Sheets

1

APPARATUS FOR SIMULTANEOUSLY RECORDING AND REPRODUCING DATA TO AND FROM A RECORDING MEDIUM

TECHNICAL FIELD

This invention relates to an information data recording/reproducing apparatus adapted for recording information data from an information data input unit to reproduce the recorded information data to output reproduced data to an information data output unit, and an information data processing system provided with such information data recording/reproducing unit.

BACKGROUND ART

Hitherto, in supplying, upon occasion, a plurality of information data recorded by a plurality of input units to plural viewers (viewing and listening persons) through a plurality of output units, reproducing units were required every plural viewers.

If information data is, e.g., video data, video tape recorders 54 were required as shown in FIG. 1 for plural viewers. For example, video signals obtained through a satellite antenna 51 were recorded onto a video tape 53 by means of a video tape recorder 52 for input to supply, upon occasion, such video tape 53 on which those video signals are recorded to viewers by means of video tape recorders 54 for output dedicated to the viewers. Moreover, the case where, e.g., video signals imaged (taken) by a camera 55 for studio are recorded by means of a video tape recorder 56 for input to provide, upon occasion, those video signals, and/or the case where video signals imaged (taken) by using a portable compact camera integrated type video tape recorder 57 at outdoor place are supplied upon occasion are also similar to the above.

Meanwhile, as shown in FIG. 1, in the video data recording/reproducing system in which input video tape recorders 52 and 56, and output video tape recorders 54 are used to send out recorded video signals to viewers, as occasion demands, various problems were arisen resulting from the fact that the recording medium is video tape 53.

Initially, in the case where a set (cluster or bundle) of video signals are assumed to be called video data file, when such one video data file is being recorded, it was difficult to reproduce, without interrupting recording of the entirety of the video data file, the portion recorded earlier by several ten minutes within the video data file.

Moreover, it was impossible to supply one video data file to plural viewers under the state shifted by small time differences. To realize this, it was necessary to prepare plural video tapes on which corresponding video data file is copied and recorded.

Further, it was impossible to reproduce a plurality of video data files within the same video tape without interruption in an arbitrary order that viewers desire. To realize this, it was necessary to prepare a video tape on which plural video data files are recorded in an arbitrary order that viewers desire.

Further, it was impossible to reproduce, without interruption, plural video data files with respect to different video tapes.

Further, in the above-mentioned video data recording system, video data from respective dedicated input units are recorded by a single recording unit and is reproduced by a single reproducing unit for a single viewer. Recording/reproduction operations of plural channels were not carried out by a single recording/reproducing unit. For this reason, first of all, there resulted high cost in construction of the system.

This invention has been made in view of the above-described actual circumstances, and its object is to provide an information data recording/reproducing apparatus and an information data processing system which are capable of reproducing the portion recorded earlier by, e.g., several minutes to several ten minutes within the same data file in the state where interruption of recording of the entirety of the data file is caused to be unnecessary.

Another object of this invention is to provide an information data recording/reproducing apparatus and an information data processing system which can supply the same data file to plural viewers in the state shifted by arbitrary time differences.

A further object of this invention is to provide an information data recording/reproducing apparatus and an information data processing system which can make time-division recording/reproduction of plural channels.

DISCLOSURE OF THE INVENTION

An information data recording/reproducing apparatus according to this invention comprises: input means adapted so that information data are continuously inputted thereto; data compressing means for compressing information data inputted from the input means to obtain compressed data; input buffer means for temporarily storing the compressed data obtained by the data compressing means; recording/reproducing means for recording the compressed data read out from the input buffer means onto a recording medium, and reproducing the compressed data recorded on the recording medium; output buffer means for temporarily storing the compressed data reproduced by the recording/reproducing means; data expanding means for expanding the compressed data read out from the output buffer means; output means for outputting data expanded by the expanding means; and control means for controlling read-out timing of the compressed data from the input buffer means, read-out timing of the compressed data from the output buffer means, and operations of recording and reproduction of the compressed data by the recording/reproducing means so that recording onto the recording medium of the compressed data and reproduction from the recording medium by the recording/reproducing means are carried out in a time divisional manner, and the information data are continuously outputted from the output means.

The information data recording/reproducing apparatus is such that the recording/reproducing means is composed of a plurality of recording/reproducing circuits for recording/reproducing the compressed data, and includes dividing means for dividing the compressed data compressed by the compressing means in correspondence with the plurality of recording/reproducing circuits.

Moreover, the information data recording/reproducing apparatus further includes error correction code adding means for adding error correction code to the compressed data thus to allow at least one of the plurality of recording/reproducing circuits to record/reproduce only the error correction code.

Further, the input means of the information data recording/reproducing apparatus is composed of a plurality of interface circuits, the data compressing means is composed of a plurality of compressing circuits for respectively compressing the information data inputted through the plurality of interface circuits; the input buffer means is composed of a plurality of input buffer circuits for respectively storing the compressed data compressed at the plurality of compressing circuits; the recording/reproducing means is composed of a plurality of recording/reproducing circuits for recording/reproducing the compressed data; and the output buffer means is composed of a plurality of output buffer circuits for respectively temporarily storing the compressed data reproduced at the plurality of recording/reproducing circuits; and the apparatus further includes distribution gathering means connected between the plurality of input buffer circuits and the plurality of output buffer circuits and the plurality of recording/reproducing circuits, operative to divide the compressed data supplied from one of the plurality of input buffer circuits to supply them to the plurality of recording/reproducing circuits, and to gather compressed data respectively reproduced from the plurality of recording/reproducing circuits to supply the gathered data to one of the plurality of output buffer circuits.

Further, the recording/reproducing circuit of the information data recording/reproducing apparatus is a disc unit adapted for recording the compressed data onto a disc shaped recording medium, and reproducing the compressed data from the disc-shaped recording medium.

In addition, the information data recording/reproducing apparatus may be used under the state where the input means and the output means, the data compressing means and the data expanding means, and the input buffer means and the output buffer means are respectively selectively replaced each other.

An information data processing system according to this invention comprises: at least one information data input unit for generating information data; at least one information data output unit; and an information data recording/reproducing unit including data compressing means for compressing the information data supplied from the information data input unit to obtain compressed data, input buffer means for temporarily storing the compressed data obtained by the data compressing means, recording/reproducing means for recording the compressed data read out from the input buffer means onto a recording medium, and reproducing the compressed data recorded on the recording medium, output buffer means for temporarily storing the compressed data reproduced by the recording/reproducing means, data expanding means for expanding the compressed data read out from the output buffer means, and control means for controlling read-out timing of the compressed data from the input buffer means, read-out timing of the compressed data from the output buffer, operations of recording and reproduction of the compressed data by the recording/reproducing means so that recording onto the recording medium of the compressed data and reproduction from the recording medium by the recording/reproducing means are carried out in a time-divisional manner, and the information data are continuously outputted with respect to the output unit.

Moreover, another information data processing system according to this invention comprises: at least one information data input unit for generating information data; a data compressing unit for compressing the information data supplied from the information data input unit to obtain compressed data; an information data recording/reproducing unit comprising input buffer means for temporarily storing the compressed data obtained by the data compressing unit, recording/reproducing means for recording the compressed data read out from the input buffer means onto a recording medium and reproducing the compressed data recorded on the recording/reproducing means, output buffer means for temporarily storing the compressed data reproduced by the recording/reproducing means, and control means for controlling read-out timing of the compressed data from the input buffer means, read-out timing of the compressed data from the output buffer and operations of recording and reproduction of the compressed data by the recording/reproducing means so that recording onto the recording medium of the compressed data and reproduction from the recording medium by the recording/reproducing means are carried out in a time divisional manner, and the information data are continuously outputted with respect to at least one information data output unit described below through a data expanding unit described below; the data expanding unit for expanding the compressed data outputted from the information data recording/reproducing unit; and the information data output unit for outputting data expanded by the data expanding unit.

The recording/reproducing means of the information data recording/reproducing unit that the above-mentioned another information data processing system comprises is composed of a plurality of recording/reproducing circuits for recording/reproducing the compressed data, and dividing means for dividing the compressed data in correspondence with the plurality of recording/reproducing circuits.

Moreover, the information data recording/reproducing unit that the above-mentioned another information data processing system comprises further includes error correction code adding means for adding error correction code to the compressed data, wherein at least one of the plurality of recording/reproducing circuits records/reproduces only the error correction code.

Further, the data compressing unit that the above-mentioned another information data processing system comprises is composed of a plurality of compression circuits; the input buffer means is composed of a plurality of input buffer circuits for respectively storing the compressed data compressed by the plurality of compressing circuits; the recording/reproducing means is composed of a plurality of recording/reproducing circuits for recording/reproducing the compressed data; and the output buffer means is composed of a plurality of output buffer circuits for respectively temporarily storing the compressed data reproduced at the plurality of recording/reproducing circuits, the information data recording/reproducing unit further including distributing/gathering means connected between the plurality of input buffer circuits and the plurality of output buffer circuits and the plurality of recording/reproducing circuits, and operative to divide the compressed data supplied from one of the plurality of input buffer circuits to supply them to the plurality of recording/reproducing circuits to gather compressed data respectively reproduced from the plurality of recording/reproducing circuits to supply the gathered data to one of the plurality of output buffer circuits.

Moreover, the input buffer means and the output buffer means of the information data recording/reproducing unit that the above-mentioned another information data processing system comprises may be used under the state where they are respectively selectively exchanged each other.

Further, the recording/reproducing means of the information data recording/reproducing unit that the above-mentioned another information data processing system comprises includes plural number (except for multiple of 2 and 3) of recording/reproducing circuits, wherein the control means controls the plurality of recording/reproducing circuits so that they sequentially distribute video signals divided in frame or field units to record them, and is operative so that in the case where n times speed of reproduction of the video signals is carried out, the control means controls the plurality of recording/reproducing circuits so as to reproduce in parallel video signals of n frame interval or n field interval from the recording medium to transfer it to a buffer memory to obtain a video signal of frame or field of n times speed from the buffer memory.

The recording/reproducing circuit of the information data recording/reproducing unit that the above-mentioned another information data processing system comprises is a disc unit adapted for recording the compressed data onto a disc-shaped recording medium to reproduce the compressed data from the disc-shaped recording medium.

BEST MODE FOR CARRYING OUT THE INVENTION

Preferred embodiments of an information data recording/reproducing apparatus and an information data processing system according to this invention will now be described with reference to the attached drawings.

First of all, an embodiment of an information data recording/reproducing apparatus according to this invention will be described below as a first embodiment. This first embodiment is directed to a video data recording/reproducing apparatus in which video data is handled as information data to record a set (cluster or bundle) of the video data as video data file onto a disc-shaped recording medium such as hard disc or magneto-optical disc to reproduce the video data file from the disc-shaped recording medium. This video data recording/reproducing apparatus is used in a Video Server for providing the video data file for a plurality of terminals.

Figure 1:
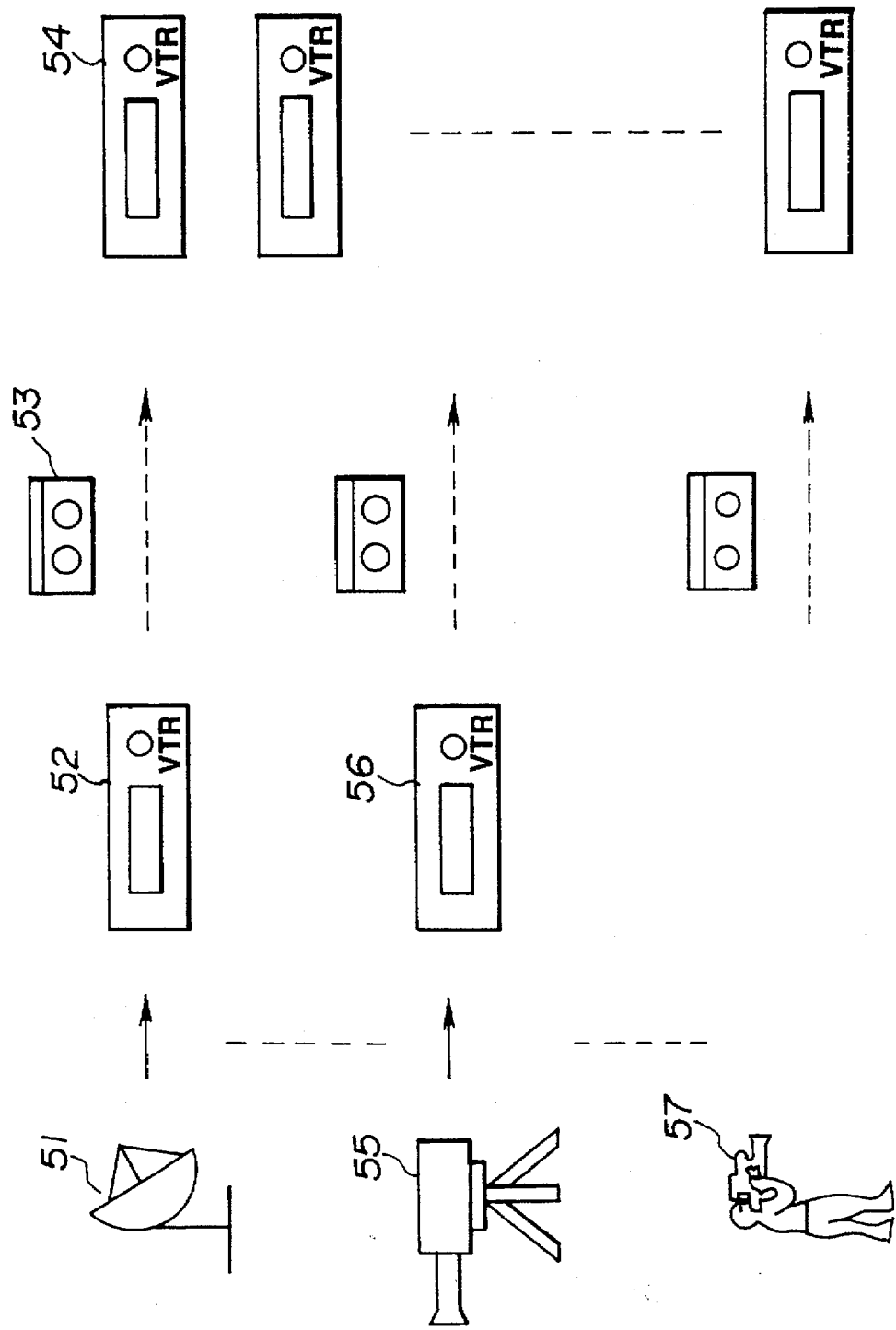
FIG. 1 is a view for explaining a conventional video data recording/reproducing system.
Figure 2:
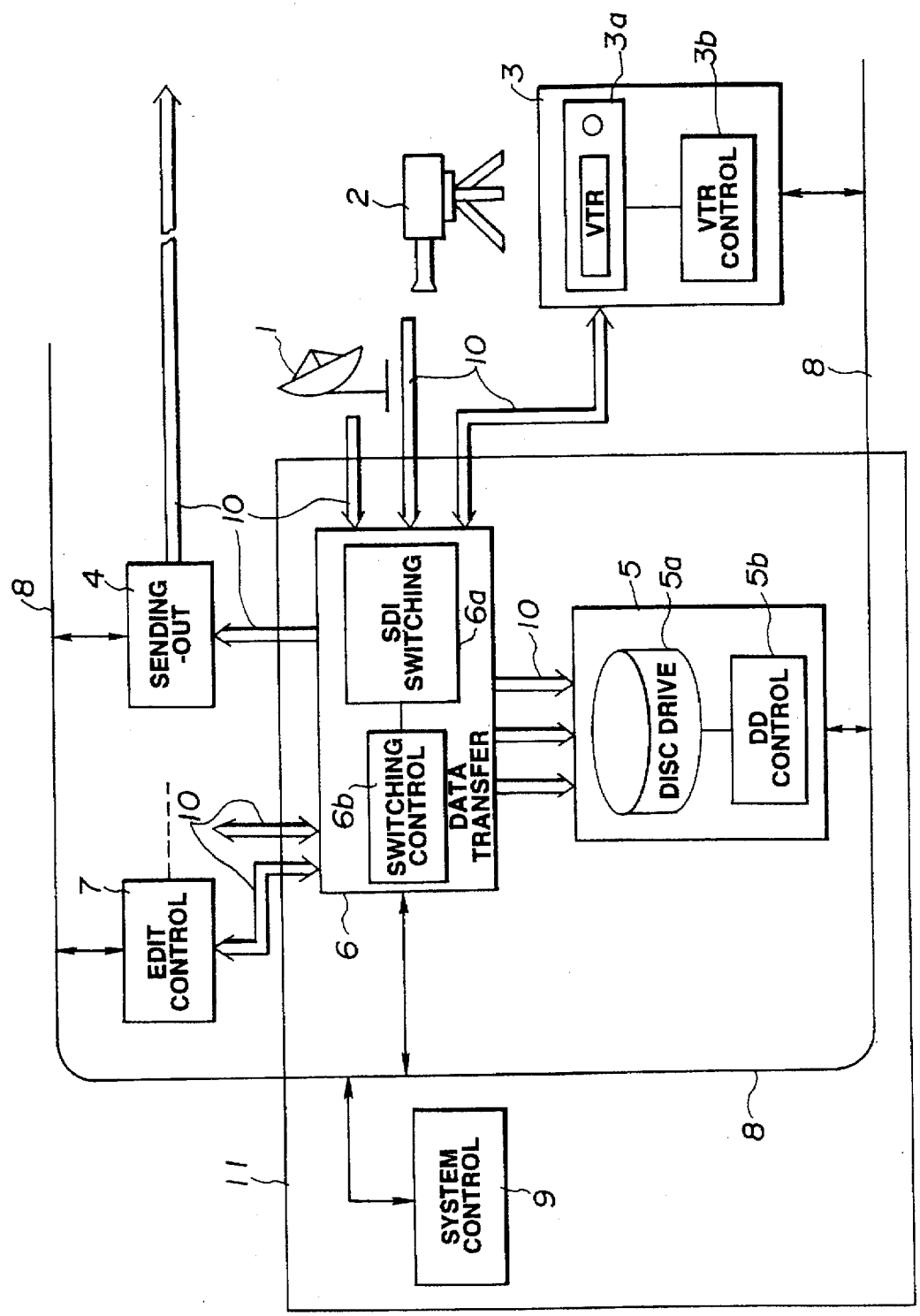
FIG. 2 is a view showing the state where a video data recording/reproducing apparatus (unit) of a first embodiment of this invention is assembled into a video server system.

Initially, the video data recording/reproducing apparatus which is the first embodiment assembled into the video server system will be described with reference to FIG. 2. Video server system 11 comprises, as shown in FIG. 2, the video data recording/reproducing unit (apparatus) 5 provided with recording/reproducing means for recording one channel or plural channels of video data supplied from a video data input unit such as a receiving antenna i for communication satellite, a television camera 2 and a video tape recorder 3, etc. to reproduce the recorded video data file into data of one channel or plural channels to output, in an arbitrary order, reproduced data to a video data output unit such as a video tape recorder 3, a signal sending (transmitting) unit 4 and a picture monitor unit, etc., and to carry out, in a time divisional manner, recording and reproduction of the video data; a data transfer unit 6 for serially transmitting video data from the video data input unit to the video data recording/reproducing unit 5 and transferring video data file from the video data recording/reproducing unit 5 to the video data output unit; an edit control unit 7 for editing video data file supplied through the data transfer unit 6; and a system control unit 9 for controlling, through a control system network 8, operations of the video tape recorder 3, the signal sending unit 4 and the video data recording/reproducing unit 5. While signal sending unit 4, edit control unit 7, etc. are illustrated in such a manner that they exist outside the video server system 11, the video server system 11 is assumed to include these units in a broad sense as described above.

The video data recording/reproducing unit 5 comprises a disc drive 5a and a disc drive control section 5b. The disc drive control section 5b controls the operation of the disc drive 5a on the basis of a control signal supplied from the system control unit 9.

The data transfer unit 6 comprises a SDI (Serial Digital Interface) switching section 6a, and a switching control section 6b. The switching control section 6b allows the SDI switching section 6a to convert the video data into serial data on the basis of a control signal supplied from the system control unit 9.

The video tape recorder 3 which serves as both the video data input unit and the video data output unit comprises a video tape recorder body section 3a and a video tape recorder control section 3b. The video tape recorder control section 3a control the operation of the video tape recorder body section 3a on the basis of a control signal supplied from the system control unit 9.

Between the video data input unit, the video data output unit, video data recording/reproducing unit 5, the data transfer unit 6 and the edit control unit 7, data transfer system networks 10 are provided as shown. The video data is transmitted through the data transfer system networks 10. An output signal of the video server system 11 is outputted also to an external unit, e.g., a picture monitor unit through the data transfer system network 10 from the signal sending-out (transmitting) unit 4.

Video data obtained from video tape recorder 3, satellite antenna 1 and television camera 2 which serve as the video data input unit are once recorded at the video data recording/reproducing unit 5 through the data transfer unit 6. At this time, between the video data input unit and the data transfer unit 6, the video data is subjected to serial digital transmission as described above. This data transfer unit 6 connects between arbitrary equipments by SDI switching section 6a.

As stated above, the data transfer unit 6 and the video data recording/reproducing unit 5 which constitute video server system 11 set connection between equipments or recording place on the basis of control command (instruction) supplied from the system control unit 9 through the control system network 8 to record video data supplied through the data transfer system network 10 from the input data unit. As the control system network 8, computer network such as network of medium scale using coaxial cable or large scale network, etc. using optical fiber may be utilized.

Video data recorded in the video data recording/reproducing unit 5 is read out from the disc drive 5a by control of the edit control unit 7, and is caused to undergo edit processing by the edit control unit 7. The video data to which edit processing has been implemented at the edit control unit 7 is recorded onto the disc drive 5a for a second time. In this case, in addition to address data of video data which has not yet been caused to undergo edit processing, address data of video data after undergone edit processing is held at the system control unit 9. In addition, in the case where edit processing is not particularly required, and a portion necessary for sending-out is selected, since such selective operation is required to have only address of the necessary portion, such address data is held at the system control unit 9.

Information relating to edit processing which has been executed in accordance with control of the edit control unit 7 is held at the system control unit 9, and is sent also to a signal sending out unit 4 via the control system network 8. Video data which has been read out from the video data recording/reproducing unit 5 is sent out to the external through data transfer unit 6, signal sending unit 4 and data system network 10.

As described above, the video data recording/reproducing device 5 which serves as the first embodiment is composed of disc unit 5a and disc drive control section 5b for controlling the disc drive 5a.

Initially, outline of the configuration of the video data recording/reproducing unit 5 will be described with reference to FIG. 3.

This video data recording/reproducing unit 5 comprises disc drive 5a including a serial digital interface (hereinafter referred to as SDI/F) section 20 adapted so that the video data are continuously inputted thereto, a compressing/expanding section 22 for compressing video data inputted from the SDI/F section 20 to obtain compressed video data and carrying out expanding processing which will be described later, a buffer memory section 23 serving as input buffer means for temporarily storing compressed video data obtained by the compressing/expanding section 22, a disc unit section 28 for recording, onto, e.g., a magneto-optical disc, the compressed video data which has been read out from the buffer memory section 23 to reproduce the compressed video data recorded on the magneto-optical disc, the buffer memory section 23 doubling as output buffer means for temporarily storing the compressed video data reproduced by the disc unit section 28, the compressing/expanding section 22 doubling as data expanding means for expanding the compressed video data which has been read out from the buffer memory section 23, and the SDI/F section 20 doubling as output means for outputting data expanded by the compressing/expanding section 22; and disc drive control section 5b for allowing the disc unit section 28 to carry out, in a time-series manner, recording onto the magneto-optical disc of the compressed video data and reproduction from the magneto-optical disc, and controlling read-out timing of the compressed video data from the buffer memory section 23 as the input buffer means, read-out timing of the compressed-video data from the buffer memory section 23 as the output buffer means, and operation of recording/reproduction of the compressed video data by the disc unit section 28 to allow the SDI/F section 20 to continuously output the compressed video data therefrom.

Detailed configuration of the disc drive 5a will now be described.

Serial digital video data inputted from the SDI/F section 20 is supplied to the compressing/expanding section 22 through a data formatter section 21 for formatting the serial digital video data so as to become in conformity with processing within the disc drive 5a. The compressing/expanding section 22 compresses the video data supplied through the data formatter section 21 to decrease quantity of data transferred. It is conceivable that the compression processing at this time is carried out in dependency upon intra-field or intra-frame difference, or inter-field or inter-frame difference of video data. Ordinarily, in the case where such a compression processing is carried out, memory means such as frame memory or field memory are required. In this video data recording/reproducing unit, however, buffer memory section 23 may be commonly used as the memory means. Compressed video data which is output of the compressing/expanding section 22 is supplied to a distributing/gathering section 24 through the buffer memory section 23. This distributing/gathering section 24 distributes the compressed video data to the disc unit section 28 through error check code adding/detecting section 25, buffer memory section 26 and protocol controller section 27 which will be described later.

Figure 3:
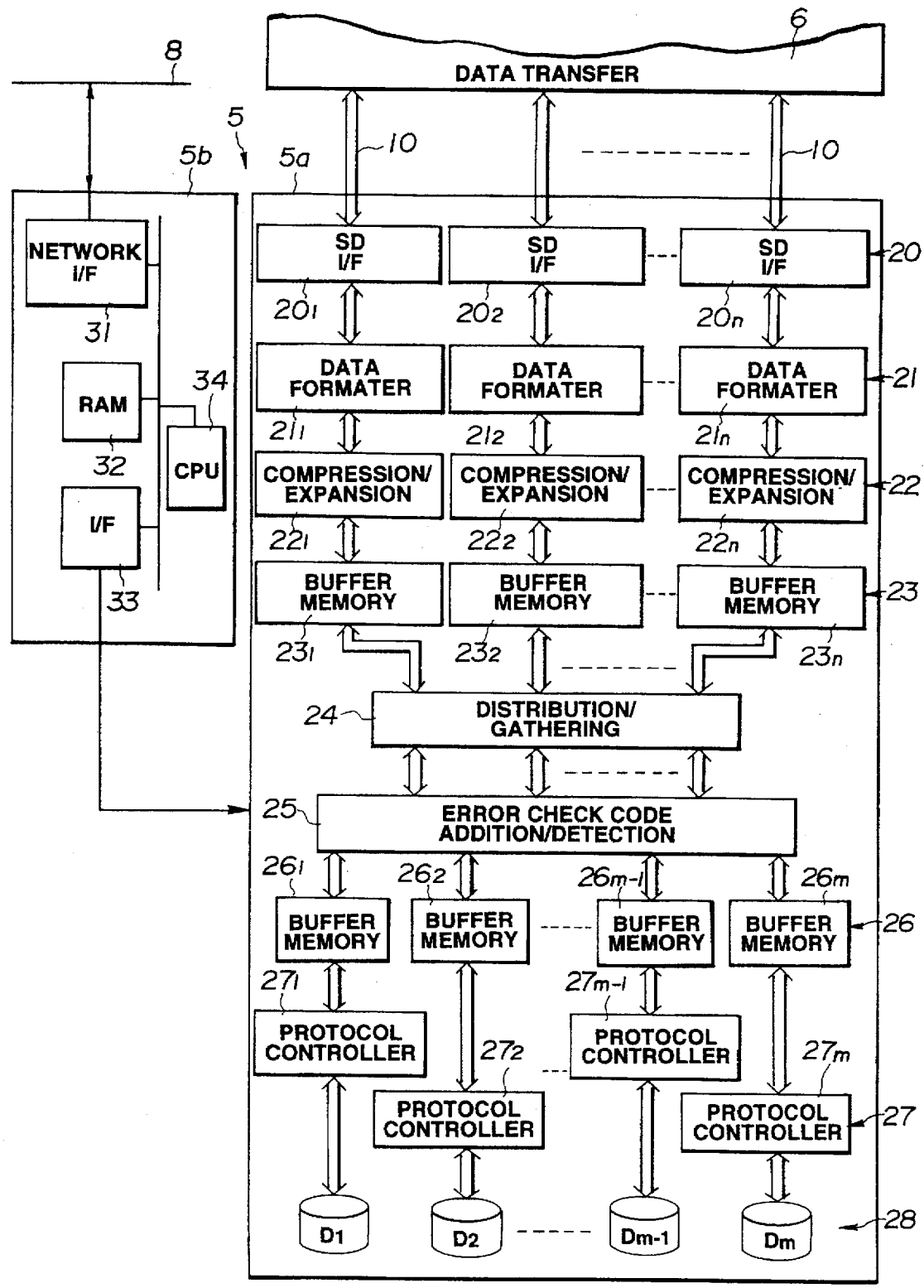
FIG. 3 is a view showing the configuration of the video data recording/reproducing apparatus.

While illustration is made in FIG. 3 such that disc unit section 28 is composed of magneto-optical disc units D1, D2 ... $D_{m-1}$, $D_m$, this invention can be realized by using only one magneto-optical disc unit D1. In the case where the disc device section 28 is comprised of only one magneto-optical disc unit D1, the distributing/gathering section 24 allows the compressed video data from the buffer memory section 23 to be simply passed therethrough to supply it to the error check code adding/detecting section 25. Moreover, in the case where the disc unit section 28 is composed of a plurality of magneto-optical disc units D1, D2 ... $D_{m-1}$, $D_m$, the distributing/gathering section 24 divides the compressed video data from the buffer memory section 23 to supply them to the error check code adding/detecting section 25.

The error check code adding/detecting section 25 adds codes for error correction to the compressed video data. The protocol controller section 27 is comprised of a Small Computer Systems Interface (hereinafter abbreviated as SCSI) protocol controller.

Detailed configuration of the disc drive control section 5b will now be described.

At the disc drive control section 5b, control command supplied from system control unit 9 through control system network 8 is taken therein through network interface 31. The control command which has been taken in through the network interface 31 is decoded at Central Processing Unit (CPU) 34. As occasion demands, the control command is stored into a Random Access Memory (RAM) 32. The control command which has been decoded at CPU 34 is supplied to the disc drive 5a via interface 33 as a control signal. This disc drive control section 5b allows the disc unit section 28 to carry out, in a time divisional manner, recording onto the magneto-optical of the compressed video data and reproduction from the magneto-optical disc, and controls read-out timing of the compressed video data from the buffer memory section 23 as the input buffer means, read-out timing of the compressed video data from buffer memory section 23 serving as the output buffer means, and operation of recording/reproduction of the divided compressed video data by the disc unit section 28 to allow the SDI/F section 20 to continuously output the video data therefrom.

The operation in the case where only one magneto-optical disc unit D1 of the disc unit section 28 is used will now be described.

In this example, data system network 10 for carrying out input/output of video data between video data recording/reproducing unit 5 and data transfer unit 6 within the server system 11 is caused to have different lines with respect to input and output. It is to be noted that this data system network 10 can freely carry out switching between input and output.

The compressed video data which has been passed through the distributing/gathering section 24 and has been caused to undergo a processing in which error check code is added thereto at the error check code adding/detecting section 25 is once (temporarily) written into a buffer memory $26_1$. A protocol controller $27_1$ records, onto the magneto-optical disc unit D1, the compressed video data which has been read out from the buffer memory $26_1$. Then, in a manner of time division with respect to the recording operation, from the magneto-optical disc unit D1, compressed video data for which request for reproduction is issued is read out through control of the protocol controller $27_1$. The compressed video data thus read out is supplied to the error check code adding/detecting section 28 through the buffer memory $26_1$, at which error detection is carried out. The error detected compressed video data is passed through distributing/gathering section 24, and is written into a buffer memory $23_2$. This compressed video data is then read out from the buffer memory $23_2$ at a predetermined timing. The data thus read out is expanded at a compressing/expanding circuit $22_2$ so that data quantity is caused to be the same as that at the time when inputted to the SDI/F circuit $20_1$. Then, the expanded video data is outputted from the data system network 10 to the data transfer unit 6 through a data formatter $21_2$ and a SDI/F circuit $20_2$.

In the case of this example, in the magneto-optical disc unit D1 of the video data recording/reproducing unit 5, there is no necessity of including a plurality of optical pick-up elements, but only one optical pick-up is used to carry out, in a time divisional manner, operations of recording and reproduction, thus permitting input and output of video data to be respectively continuously carried out without interruption in terms of time when viewed from the external of the video recording/reproducing unit 5. In addition, there is no necessity that this video data is the same video data file as video data outputted through SDI/F circuit $20_2$, but such video data may be different video data file.

The video data inputted to the video data recording/reproducing unit 5 through the data system network 10 from the data transfer unit 6 is compressed by the compressing/expanding section 22, resulting in the compressed video data. If compression factor at the compressing/expanding section 22 is, e.g., ¼, this video data recording/reproducing unit 5 can handle video data of 4 channels at the same time. For example, in the case where attention is drawn to the fact that only recording operation is carried out, when the compression factor is assumed to be ¼, it is possible to record, in a time divisional manner, four inputs.

Time-division recording of four inputs $IN_1$, $IN_2$, $IN_3$ and $IN_4$ will now be described with reference to FIG. 4.

Figure 4:
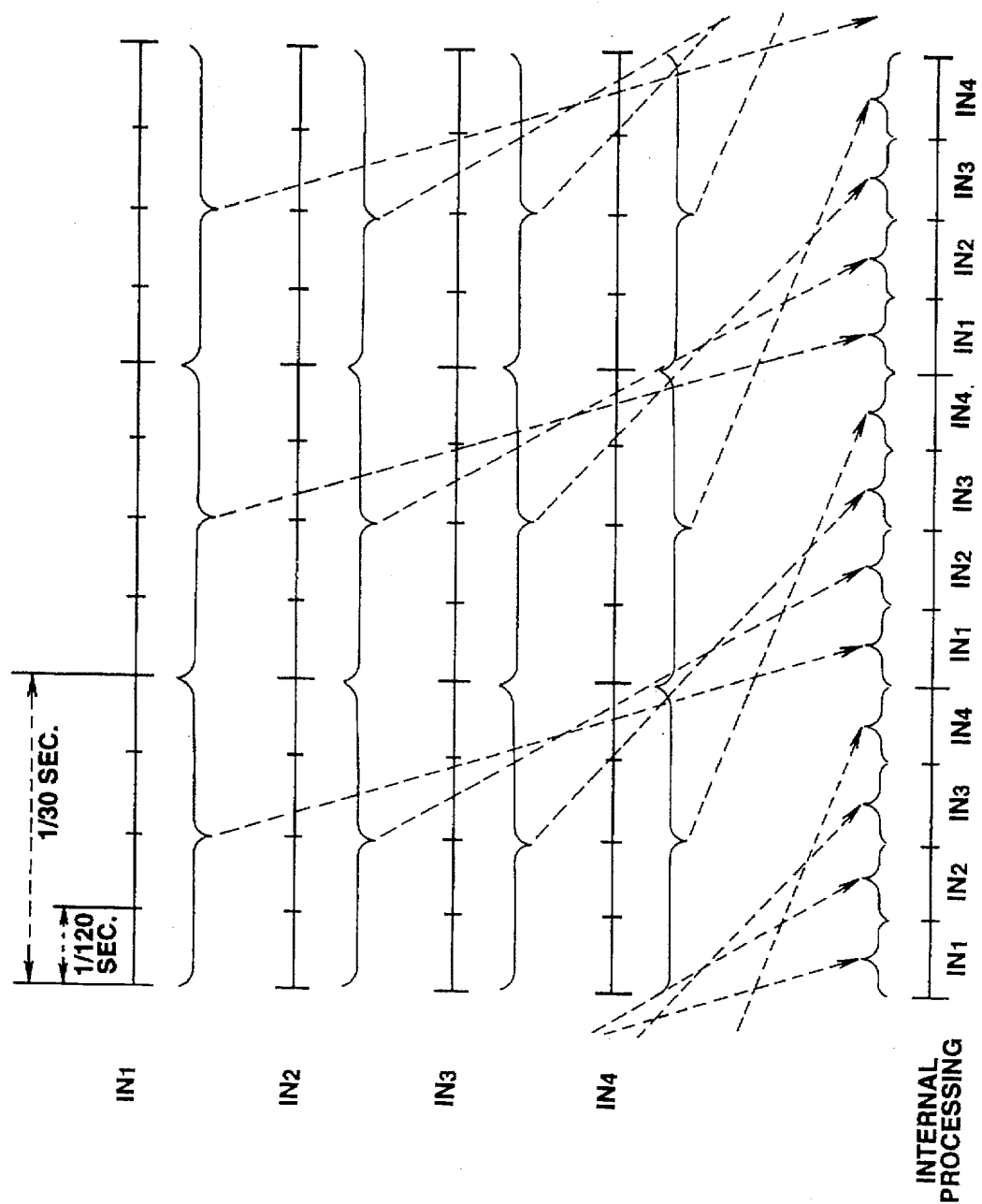
FIG. 4 is a timing chart at the time of recording operation of the video data recording/reproducing apparatus.

Initially, four inputs $IN_1$, $IN_2$, $IN_3$ and $IN_4$ as shown in FIG. 4 are stored into four buffer memories $23_1$, $23_2$, $23_3$ and $23_4$ through four SDI/F $20_1$, $20_2$, $20_3$ and $20_4$, four data formatters $21_1$, $21_2$, $21_3$ and $21_4$, and four compressing/expanding circuits $22_1$, $22_2$, $22_3$ and $22_4$, respectively. These four inputs $IN_1$, $IN_2$, $IN_3$ and $IN_4$ are respectively compressed by compressing/expanding circuits $22_1$, $22_2$, $22_3$ and $22_4$, whereby video data of one frame, i.e., ⅟30 seconds becomes compressed video data of ⅟120 seconds as shown in FIG. 4. Thereafter, respective compressed video data are recorded in a time divisional manner in such a manner that it takes time of ⅟120 seconds per one input at the single magneto-optical disc unit D1 through the error check code adding/detecting section 25, the buffer memory $26_1$, and the protocol controller $27_1$. Accordingly, it takes ⅟30 seconds (=⅟120 seconds×4) in total in order to carry out recording from input $IN_1$ up to input $IN_4$. For a time period during which such a recording processing is being carried out, video data of the subsequent one frame is sent in ⅟30 seconds to the compressing/expanding section 22. However, since recording processing of the above-mentioned four inputs $IN_1$, $IN_2$, $IN_3$ and $IN_4$ is completed within ⅟30 seconds, there is no possibility that input might be delayed. In this way, time-division recording of four inputs $IN_1$, $IN_2$, $IN_3$ and $IN_4$ is carried out.

Moreover, this video data recording/reproducing unit 5 compresses the video data to carry out recording and reproduction in a time divisional manner, thereby making it possible to continuously carry out, without interruption in point of time, both input of predetermined video data and output of predetermined video data when viewed from the external of the video server system 11.

Time-division recording/reproduction relating to, e.g., two inputs and two outputs will now be described with reference to FIG. 5. It is to be noted that it is assumed that two inputs $IN_1$ and $IN_2$ are respectively inputted from SDI/F $20_1$ and $20_2$, and two outputs $OUT_1$ and $OUT_2$ are respectively outputted from SDI/F $20_3$ and $20_4$. In addition, it is assumed that two inputs $IN_1$ and $IN_2$ from SDI/F $20_1$ and $20_2$ are respectively processed every video data of one frame.

Figure 5:
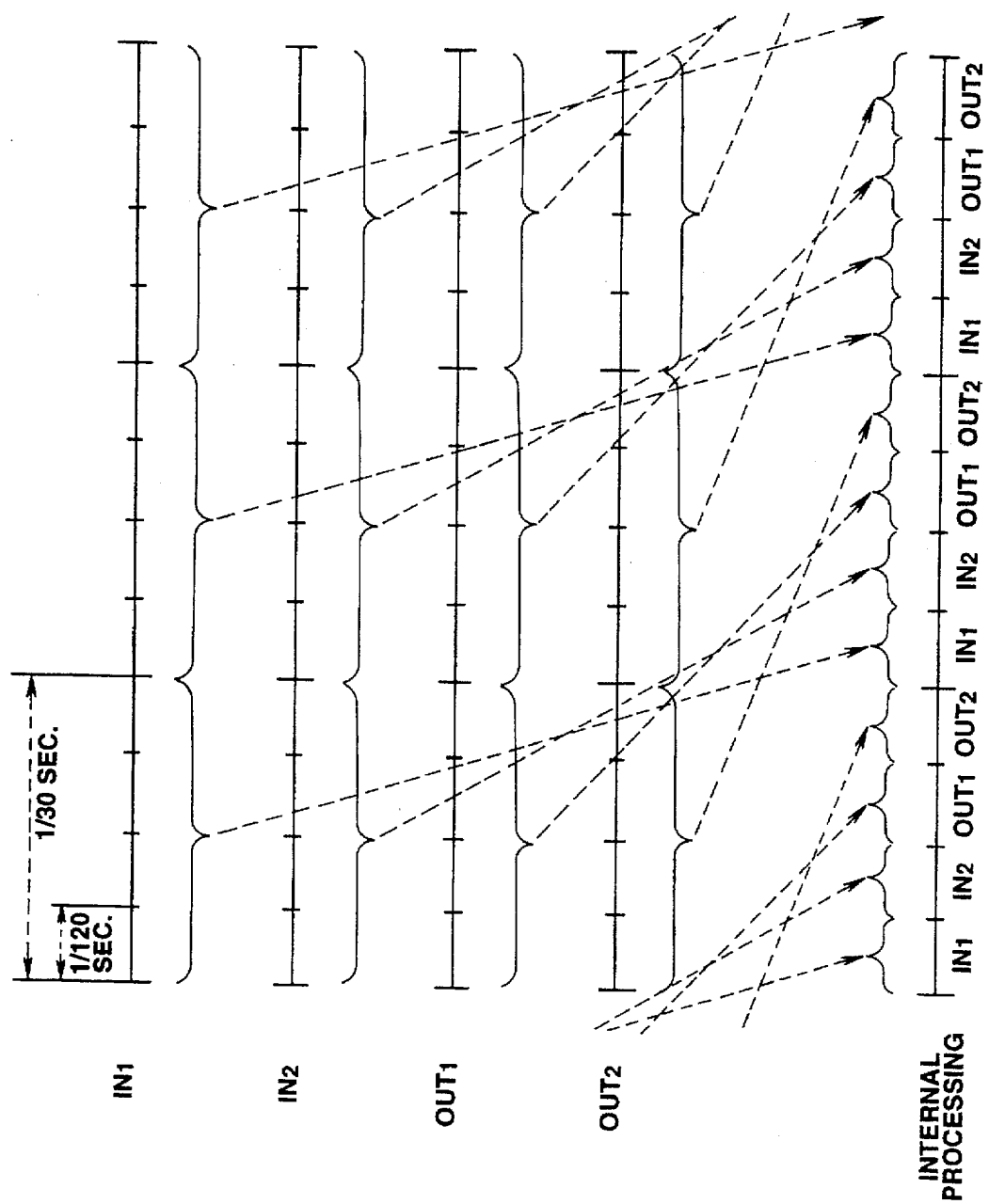
FIG. 5 is a timing chart at the time of recording/reproducing operation of the video data recording/reproducing apparatus.

Initially, with respect to two inputs $IN_1$ and $IN_2$ as shown in FIG. 5, video data of one frame are stored into two buffer memories $23_1$ and $23_2$ through SDI/F $20_1$ and $20_2$, data formatters $21_1$ and $21_2$, and compressing/expanding circuits $22_1$ and $22_2$, respectively. These two inputs $IN_1$ and $IN_2$ are respectively compressed by compressing/expanding circuits $22_1$, $22_2$, whereby video data of one frame, i.e., ⅟30 seconds becomes compressed video data of ⅟120 seconds as shown in FIG. 5. Thereafter, respective compressed data are recorded in a time divisional manner, in the state where it takes time of ⅟120 seconds per one input, onto the single magneto-optical disc unit D1 through the distributing/gathering section 24, the error check code adding/detecting section 25, the buffer memory $26_1$ and the protocol controller $27_1$.

On the other hand, two outputs $OUT_1$ and $OUT_2$ are read out in a time-divisional manner by control of the protocol controller $27_1$ from the single magneto-optical disc unit D1, and is supplied to the error check code adding/detecting section 25 through buffer memory $26_1$, at which error detection is made. The output $OUT_1$ is passed through the distributing/gathering section 24 and is written into a buffer memory $23_3$. The output OUT2 is passed through the distributing/gathering section 24 and is written into a buffer memory $23_4$. The time required until output data are written into the buffer memories $23_3$ and $23_4$ is ⅟120 seconds per one output.

The compressed video data which have been written into the buffer memories $23_3$ and $23_4$ are respectively expanded at the compressing/expanding circuits $22_3$ and $22_4$ so that compressed video data of $\frac{1}{120}$ seconds is converted into video data of $\frac{1}{30}$ seconds. The video data which have been expanded at the compressing/expanding circuits $22_3$ and $22_4$ are outputted from the data system network 10 to the data transfer unit 6 respectively through data formatters $21_3$ and $21_4$, and SDI/F circuits $20_3$ and $20_4$. The time required for this output is $\frac{1}{30}$ seconds which is the same as the times required for respective inputs $IN_1$, $IN_2$.

Accordingly, this video data recording/reproducing unit 5 compresses the video data to carry out recording and reproduction in a time divisional manner, thereby making it possible to continuously carry out, without interruption in point of time, recording of predetermined video data and reproduction of predetermined video data when viewed from the external of the video data recording/reproducing unit 5.

In FIG. 3, the SDI/F section 20 is composed of a plurality of SDI/F circuits $20_1$, $20_2$ ... $20_n$. Moreover, data compressing/expanding section 22 is composed of a plurality of compressing/expanding circuits $22_1$, $22_2$ ... $22_n$ for respectively compressing the video data inputted through the plurality of SDI/F circuits $20_1$, $20_2$ ... $20_n$. Further, buffer memory section 23 serving as input buffer means is composed of a plurality of buffer memories $23_1$, $23_2$ ... $23_n$ for respectively storing the compressed video data compressed at the plurality of compressing/expanding circuits $22_1$, $22_2$ ... $22_n$. Further, the disc unit section 28 is composed of a plurality of magneto-optical disc units D1, D2 ... $D_{m-1}$ and $D_m$ for recording/reproducing the compressed video data. In addition, the buffer memory section 23 serving as output buffer means is composed of a plurality of buffer memories $23_1$, $23_2$ ... $23_n$ for respectively temporarily storing the video compressed data which have been read out at magneto-optical disc units D1, D2 ... $D_{m-1}$ and $D_m$.

Moreover, the buffer memory section 26 is composed of a plurality of buffer memories $26_1$, $26_2$ ... $26_{m-1}$, $28_m$. Further, the protocol controller section 27 is also composed of protocol controllers $27_1$, $27_2$ ... $27_{m-1}$ and $27_m$.

Furthermore, the distributing/gathering section 24 is connected between a plurality of buffer memories $23_1$, $23_2$ ... $23_n$ and a plurality of magneto-optical disc units D1, D2 ... $D_{m-1}$ and $D_m$. By the distributing/gathering section 24, the compressed video data supplied from one of the plurality of buffer memories $23_1$, $23_2$ ... $23_n$ may be divided to distribute them to the plurality of magneto-optical disc units D1, D2 ... $D_{m-1}$ and $D_m$. In addition, the distributing/gathering section 24 may gather divided compressed video data which have been respectively read out from the plurality of magneto-optical disc units D1, D2 ... $D_{m-1}$ and $D_m$ to supply gathered data to any one of the plurality of buffer memories $23_1$, $23_2$ ... and $23_n$.

Actually, the divided compressed video data which is output of the distributing/gathering section 24 is supplied to the error check code adding/detecting section 25, at which error check code is added thereto. Then, the error check code added divided compressed video data is recorded onto magneto-optical disc units D1, D2 ... $D_{m-1}$ and $D_m$ through buffer memories $26_1$, $26_2$ ... $26_{m-1}$ and $26_m$, and protocol controllers $27_1$, $27_2$ ... $27_{m-1}$ and $27_m$. Further, respective divided compressed video data which have been read out from magneto-optical disc units D1, D2 ... $D_{m-1}$ and $D_m$ and have been reproduced through protocol controllers $27_1$, $27_2$, ... $27_{m-1}$, $27_m$, buffer memories $26_1$, $26_2$ ... $26_{m-1}$ and $26_m$, and the error check code adding/detecting section 25 are gathered at the distributing/gathering section 24, and the data thus gathered is supplied to one of buffer memories which are not used for input of the plurality of buffer memories $23_1$, $23_2$ ... $23_n$.

The compressed video data which has been read out from the one of buffer memories of the buffer memory sections 23 is expanded at corresponding one of compressing/expanding circuits $22_1$, $22_2$ ... $22_n$, and is supplied to the data transfer unit 6 from the data system network 10 through one of SDI/F circuits of the SDI/F section 20 which correspond to corresponding one of data formatters $21_1$, $21_2$ ... $21_n$.

Accordingly, disc unit section 28 composed of a plurality of magneto-optical disc units D1, D2 ... $D_{m-1}$, $D_m$ can carry out, continuously, in parallel, input and output of a greater number of channels with respect to processing time required for the input and processing time required for the output as compared to disc unit section 28 comprised of only one magneto-optical disc unit D1. Moreover, this video data recording/reproducing unit 5 can reproduce the portion recorded, e.g., earlier by several minutes to several ten minutes within the same video data file without necessity of interruption of recording of the entirety of the video data file. In addition, this video data recording/reproducing unit 5 can supply the same video data file to a plurality of viewers with an arbitrary time difference.

While, in this embodiment, the disc unit section 28 is composed of magneto-optical disc units D1, D2 ... $D_{m-1}$ and $D_m$, such disc unit section may be random accessible recording/reproducing unit such as hard disc unit, etc.

Moreover, input channel and output channel composed of SDI/F section 20, compressing/expanding section 22, buffer memory section 23 and buffer memory section 26 may be used under the state where they are respectively selectively exchanged each other.

Further, at least one of plural magneto-optical disc units D1, D2 ... $D_{m-1}$, $D_m$ may be used to record/reproduce only the error check code.

Namely, this video data recording/reproducing unit 5 can increase the number of accessible inputs/outputs, and can immediately reproduce video data being recorded at present or carry out, in parallel, without interruption, both input of arbitrary video data and output of arbitrary video data.

A second embodiment of an information data processing system according to this invention will now be described below.

Figure 6:
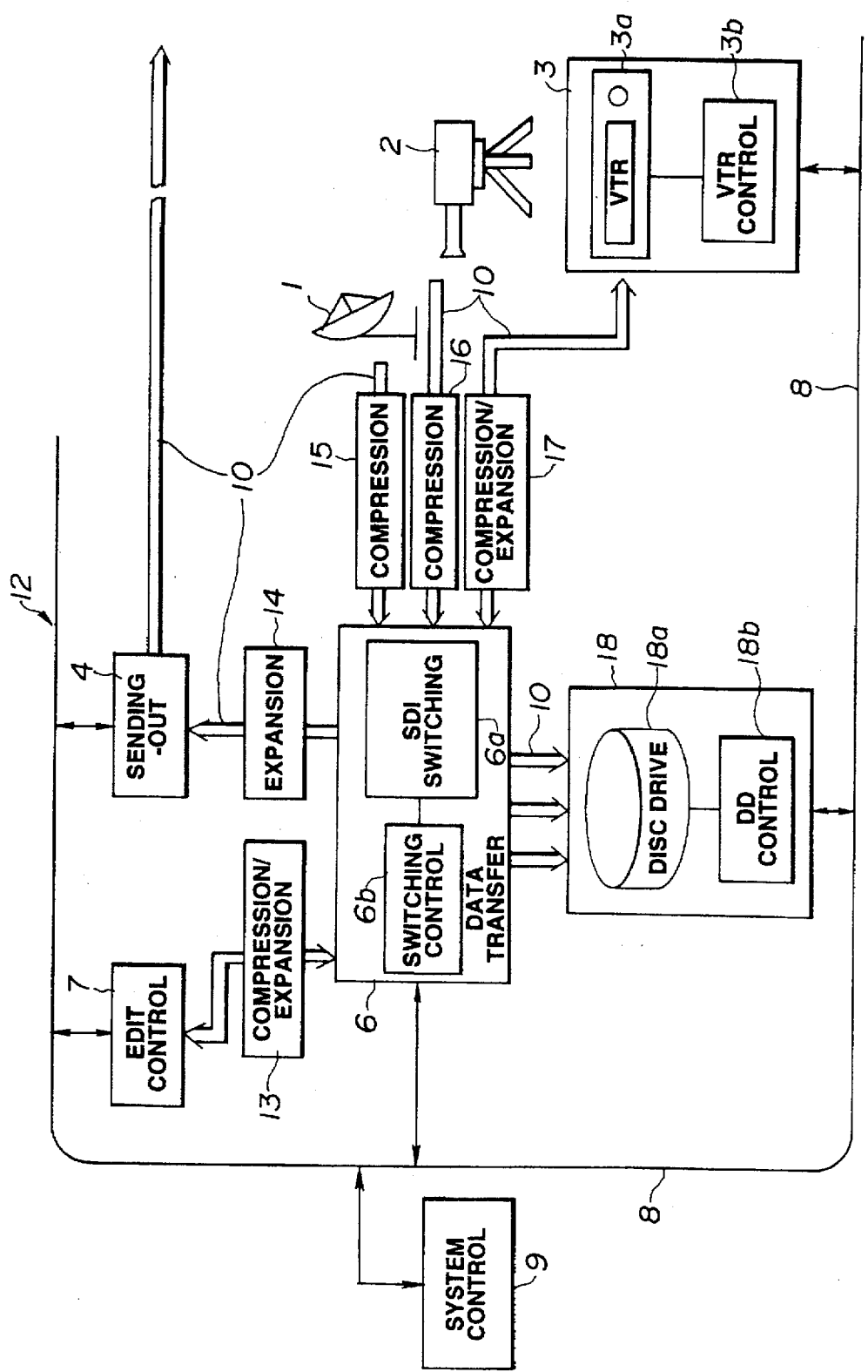
FIG. 6 is a view showing the configuration of a video data processing system which is a second embodiment of this invention.

The configuration of the entirety of video data processing system 12 which is the second embodiment is shown in FIG. 6. This video data processing system 12 is provided, at the outside of a video data recording/reproducing unit 18, with a data compressing unit for compressing input video data from a video data input unit to obtain compressed data, and/or a data expanding unit for expanding compressed data read out from output buffer means. As the data compressing unit, there are compressing units 15 and 18, and compressing/expanding units 13 and 17. Moreover, as the data expanding unit, there are expanding unit 14, and compressing/expanding units 13 and 17. In this embodiment, the compressing/expanding unit 13 is inserted in the middle of data transfer system network 10 connecting data transfer unit 6 and edit control unit 7. Moreover, the expanding unit 14 is inserted in the middle of the data transfer system network 10 connecting data transfer unit 6 and signal sending-out unit 4. Further, compressing units 15 and 16 are respectively inserted in the middle of data transfer system networks 10 connecting data transfer unit 6 and receiving antenna 1 for communication satellite and connecting data transfer unit 6 and television camera 2. In addition, compressing/expanding unit 17 is inserted in the middle of data transfer system network 10 connecting data transfer unit 8 and video tape recorder 3.

Figure 7:
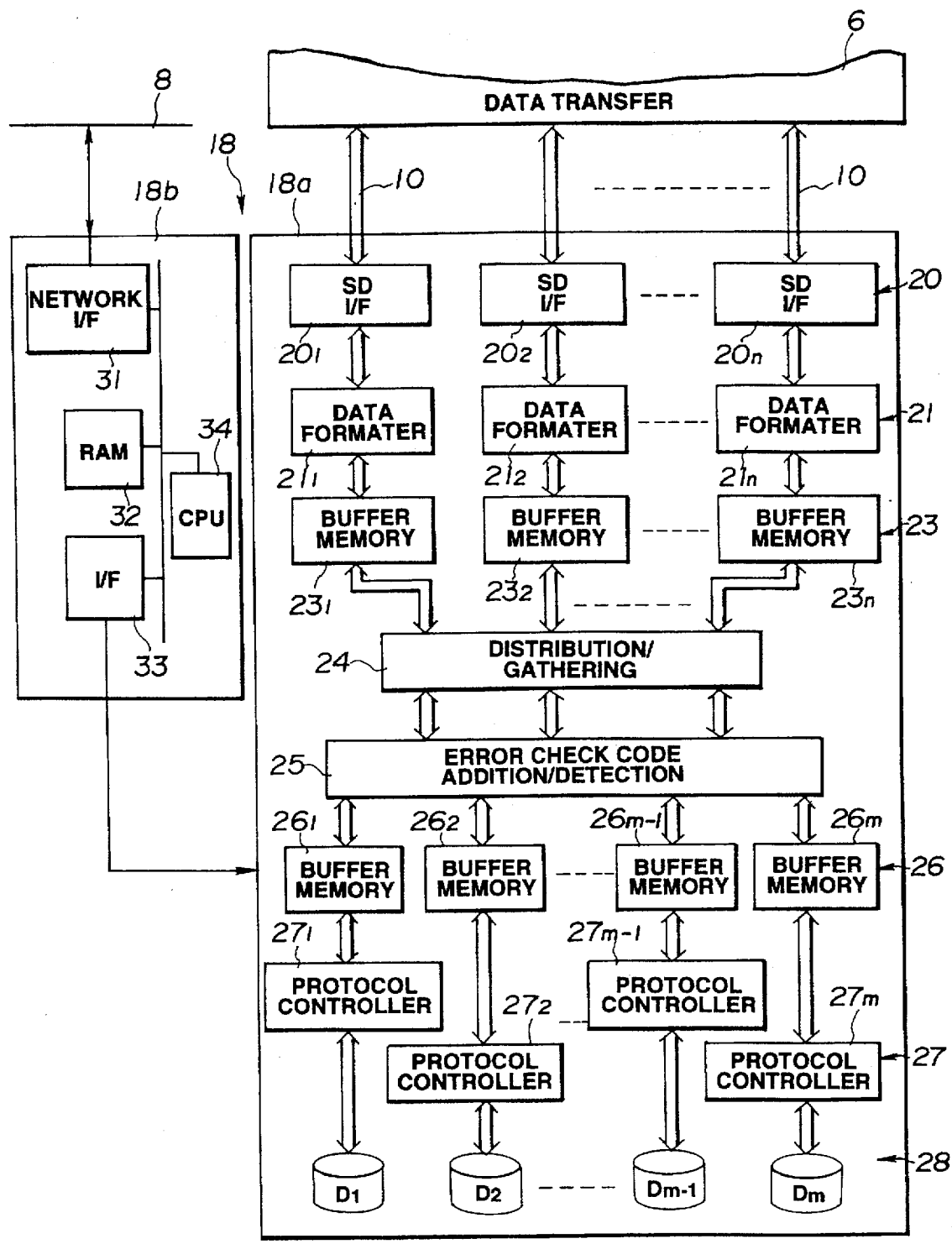
FIG. 7 is a view showing the configuration of a video data recording/reproducing apparatus (unit) used in the video data processing system shown in FIG. 6.

The video data recording/reproducing unit 18 includes, as shown in FIGS. 6 and 7, a disc drive 18a and a disc drive control section 18b. The disc drive control section 18b controls the operation of the disc drive 18a on the basis of a control signal supplied from system control unit 9.

Accordingly, outline of the configuration of the video data processing system 12 will be described below with reference to FIGS. 6 and 7.

The video data processing system 12 comprises, at the outside of the video data recording/reproducing unit 18, the video data input unit for generating video data such as video tape recorder 3, satellite antenna 1 and television camera 2, video data output unit such as signal sending-out unit 4 and picture monitor unit, etc., compressing units 15 and 16 and compressing/expanding units 13 and 17 which serve as a data compressing unit for compressing the video data supplied from the video data input unit to obtain compressed data, and expanding unit 14 and compressing/expanding units 13 and 17 which serve as a data expanding unit for expanding the compressed data to supply it to the video data output unit.

Moreover, the video data processing system 12 comprises, at the inside of the video data recording/reproducing unit 18, disc drive 18a including buffer memory section 23 serving as input buffer means for temporarily storing the compressed data obtained by the data compressing unit, disc unit section 28 for recording the compressed data read out from the buffer memory section 23 onto a magneto-optical disc, and reproducing the compressed video data recorded on the magneto-optical disc, and buffer memory section 23 doubling as output buffer means for temporarily storing the compressed video data reproduced by the disc unit section 28; and disc drive control section 18b for allowing the disc unit section 28 to carry out, in a time divisional manner, recording onto the magneto-optical disc of the compressed data and reproduction from the magneto-optical disc by the disc unit section 28, and controlling read-out timing of the compressed video data from the buffer memory section 23 as the input buffer means, read-out timing of the compressed video data from the buffer memory section 23 as the output buffer means, and operations of recording/reproduction of the compressed data by the disc unit section 28 to continuously output the compressed video data from the buffer memory section 23.

Detailed configuration of the disc drive 18a will now be described with reference to FIG. 7.

Serial digital compressed video data inputted from SDI/F section 20 is supplied to buffer memory section 23 through data formatter section 21. The buffer memory section 23 temporarily stores the compressed video data. The compressed video data which has been temporarily stored at the buffer memory section 23 is supplied to the distributing/ gathering section 24. This distributing/gathering section 24 distributes the compressed video data through error check code adding/detecting section 25, buffer memory section 28 and protocol controller section 27.

The distributing/gathering section 24 supplies the compressed video data to error check code adding/detecting section 25 for adding code for error correction. The compressed video data to which error check code has been added at the error check code adding/detecting section 25 is supplied to buffer memory section 26, and is written into the buffer memory section 26. The error check code added compressed video data which has been written into the buffer memory section 28 is recorded at the disc unit section 28 through protocol controller section 27.

In this embodiment, SDI/F section 20, data formatter section 21, buffer memory section 23, buffer memory section 26, protocol controller section 27, and disc unit section 28 have a plurality of circuits/units as shown in FIG. 7 similarly to corresponding respective portions within the above-described video data recording/reproducing unit 5.

Accordingly, the distributing/gathering section 24 is connected between a plurality of buffer memories $23_1$, $23_2 \ldots 23_n$ and a plurality of magneto-optical disc units D1, D2 $\ldots D_{m-1}$, $D_m$, and distributes the compressed video data supplied from one of the plural buffer memories $23_1$, $23_2 \ldots 23_n$ to the plural magneto-optical disc units D1, D2 $\ldots D_{m-1}$, $D_m$ of the disc unit section 28. In addition, the distributing/gathering section 24 gathers, as described below, compressed video data which have been respectively read out from the plural magneto-optical disc units D1, D2 $\ldots D_{m-1}$, $D_m$ to supply gathered data to any one of the plural buffer memories $23_1$, $23_2 \ldots 23_n$.

While, in this embodiment, the disc unit section 28 is composed of a plurality of magneto-optical disc units D1, D2 $\ldots D_{m-1}$, $D_m$, such section 28 may be composed of a plurality of hard discs.

Since detailed configuration of the disc drive control section 18b is similar to that of the disc drive control section 5b shown in FIG. 2, the same reference numerals are respectively attached to corresponding portions, and their explanation is omitted.

In this embodiment, data system network 10 for carrying input/output of video data between video data recording/ reproducing unit 18 and data transfer unit 6 within the video data processing system 12 have different lines with respect to input and output. It is to be noted that the data system network 10 can freely carry out switching between input and output.

The video data recording/reproducing unit 18 used in the video data processing system 12 has no compressing means and expanding means therein. The compressing unit and the expanding unit exist outside the video data recording/ reproducing unit 18. However, the video data processing system 12 itself has a function to compress video data to record it at the disc unit section 28 to expand reproduced compressed video data. For this reason, the video data processing system 12 can carry out input and output operations as shown in the FIGS. 4 and 5 mentioned above fundamentally as the entirety of the system.

Accordingly, this video data processing system 12 can respectively continuously carry out input and output of a large number of video data without interruption in point of time when viewed from the external.

Namely, the video data processing system 12 of the second embodiment has merits similar to those of the first embodiment.

A further embodiment of the information data processing system according to this invention will now be described as a third embodiment. The third embodiment is Video On Demand (hereinafter abbreviated as VOD) using video data recording/reproducing unit 8 which is the first embodiment.

Figure 8:
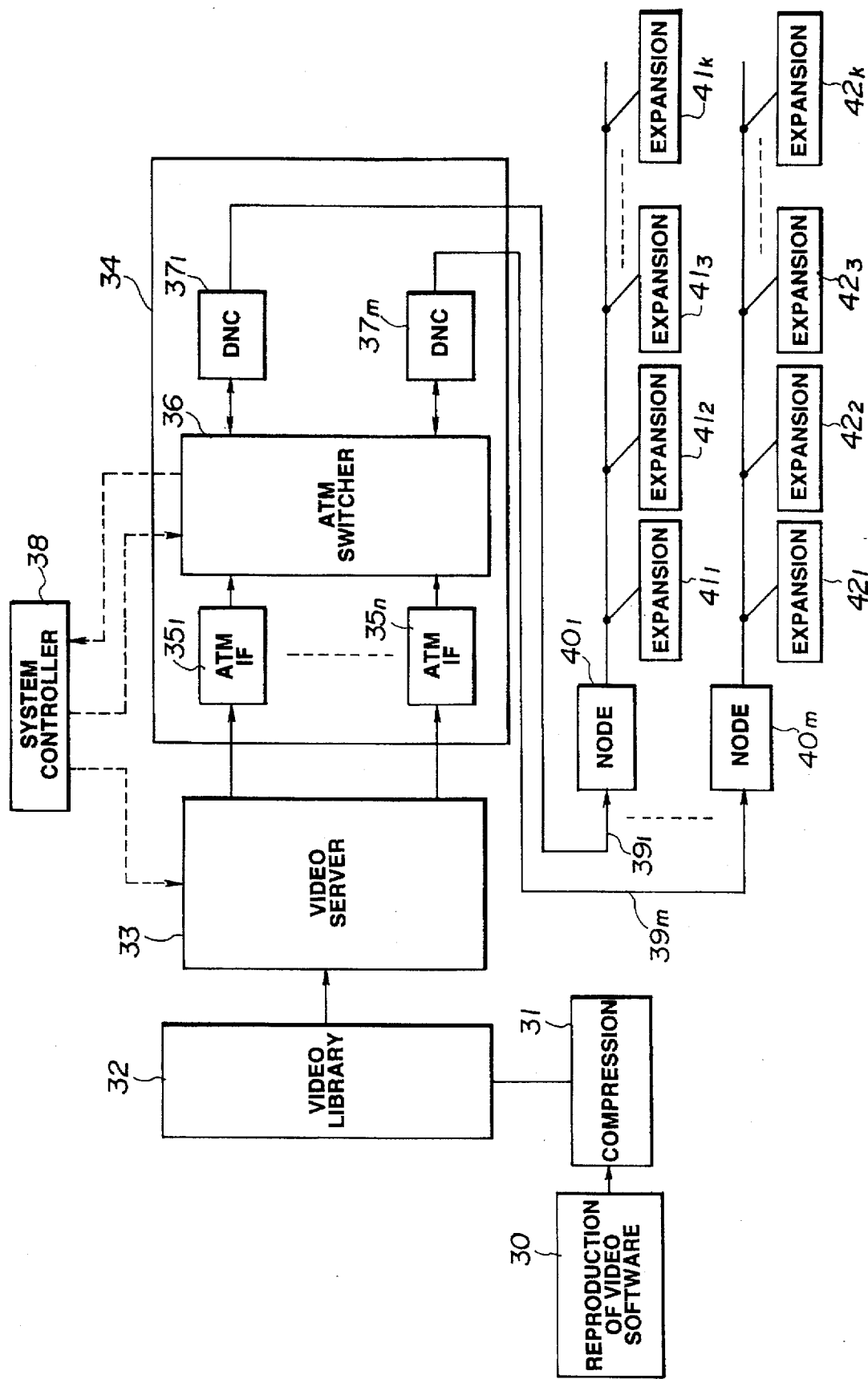
FIG. 8 is a view showing the configuration of a Video On Demand system which is a third embodiment of this invention.

This VOD system comprises, as shown in FIG. 8, a video library 32 in which a large number of video data files are stored, and a video server 33 for supplying a large number of video data files from the video library 32 to persons who makes a request for viewing and listening through a signal transmission unit 34 by control of a system controller 38.

Video data from a video software reproducing unit 30 for reproducing video media such as video tape or video disc, etc. is compressed at a compressing unit 31. The data thus compressed is then recorded onto a magneto-optical disc and is stored thereon at the video library 32.

The video server 33 further compresses video data file recorded on the magneto-optical disc of the video library 32 by using, e.g., video data recording/reproducing unit 5 of the first embodiment to record them in a time divisional manner at the disc unit section 28. Then, the recorded compressed video data is reproduced in a time divisional manner and is expanded. The data thus reproduced and expanded is outputted to data transfer unit (signal transmission unit) 34. Since recording/reproduction operation in a time divisional manner of the video server system 33 is similar to that of the video data recording/reproducing unit 5 of the first embodiment, their explanation is omitted here.

The compressed video data supplied from the video server 33 is supplied to an ATM switcher 38 through Asynchronous Transfer Mode (hereinafter abbreviated as ATM) interface $35_1 \ldots 35_n$ constituting signal sending unit 34. Then, the compressed video data is supplied to Digital Node Controller (hereinafter referred to as DNC) $37_1 \ldots 37_m$ selected by the ATM switcher 38. Then, the compressed video data is sent to NODE receiving units $40_1 \ldots 40_m$ through optical fiber cables $39_1 \ldots 39_m$. These NODE receiving units $40_1 \ldots 40_m$ are disposed with, e.g., user living areas being as units. For example, expanding units $41_1, 41_2, 41_3 \ldots 41_k$ are connected to NODE receiving unit $40_1$. Moreover, expanding units $42_1, 42_2, 42_3, \ldots 42_k$ installed every users are connected to NODE receiving unit $40_m$.

Request signal from user is supplied from an operation unit (not shown) installed on the user side along with expanding units $41_1, 41_2, 41_3 \ldots 41_k$ to ATM switcher 36 through optical fiber cables $39_1 \ldots 39_m$ and DNCs $37_1 \ldots 37_m$. The ATM switcher 36 supplies this request signal to the system controller 38. The system controller 38 decodes the request signal to control the video server 33 on the basis of the decoded result, and sends a message indicating that the request signal has been received to user through ATM switcher 36, etc.

The video server 33 takes video data file corresponding to a control signal from the system controller 38 into the disc unit section 28 by the disc unit section 28 from the video library 32. Then, the video server 33 reproduces video data file corresponding to the control signal. The reproduced video data file is transmitted to the expanding unit of user through signal sending unit 34, optical fiber cables $39_1 \ldots 39_m$, and NODE receiving units $40_1 \ldots 40_m$.

Since the VOD system serving as the third embodiment uses the above-mentioned video data recording/reproducing unit 5 in this way, it is possible to carry out, in a time divisional manner, recording and reproduction of a plurality of video data files.

Meanwhile, it is estimated that, in this VOD system, such a request to view video data file by variable speed, such as, for example, double or triple speed may be issued from user. For this reason, in the VOD system of the third embodiment, the disc unit section 28 of the video data recording/ reproducing unit 5 within the video server 33 is constructed as follows. It is to be noted that while video data file of one channel is assumed to be dealt for the brevity of explanation, it is easy to expand the number of channels to plural channels.

In the case where the number of magneto-optical disc units constituting the disc unit section 28 is set to value except for multiple of 2 and 3, e.g., 7, video data divided in, e.g., frame units or field units are sequentially distributed to seven magneto-optical disc units D1, D2, D3, D4, D5, D6 and D7 and are recorded therein, and those video data are caused to undergo n times speed reproduction, an approach is employed to reproduce, in parallel, video data of the n frame interval or n field interval from the recording medium to transfer them to the buffer memory to obtain video signals of frame or field of the n times speed from the buffer memory.

When attention is drawn to one channel, sequential distributing recording in this case is to divide video data in frame units to distribute divided data to seven magneto-optical disc units D1, D2, D3, D4, D5, D6 and D7 in the frame units to record them.

Figure 9:
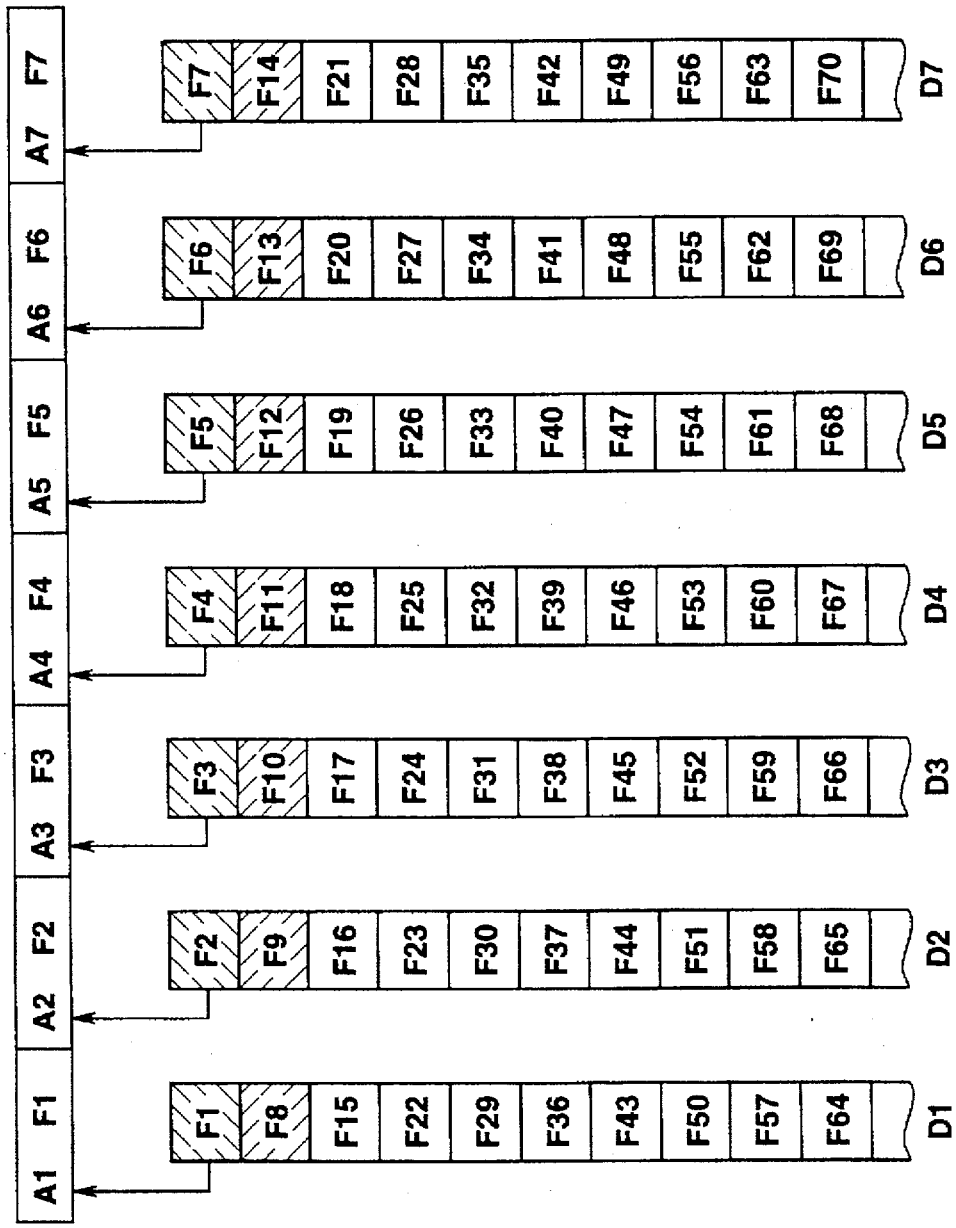
FIG. 9 is a view for explaining standard reproduction operation that the Video On Demand system shown in FIG. 8 carries out.

The state thereof will now be described with reference to FIG. 9. Input video data divided in frame units are recorded in parallel in such a manner that frame F1 is recorded onto magneto-optical disc unit D1, frame F2 is recorded onto magneto-optical disc unit DE, and frame F3 is recorded onto the magneto-optical unit D3. For this reason, input video data are recorded at 7 frame intervals in a manner of frame F1, frame F8, frame F15 ... onto, e.g., magneto-optical disc unit D1.

Reproduction by various speeds of the disc unit section 28 in the case where input video data are being caused to undergo distributing sequential recording in frame units in this way will now be described below.

Initially, standard reproduction will now be described with reference to FIG. 9.

In this case, the protocol controller 27 reads, from magneto-optical disc unit D1~magneto-optical disc unit D7, by control of the disc drive control section 5b, video data of frame unit of frame F1 up to frame F7 recorded on magneto-optical disc units D1~D7 to store them into predetermined areas A1~A7 of the buffer memory 28. When taking in of data has been completed, the buffer memory 28 sends out video data of frame F1~frame F7 to the error check code adding/detecting section 25. For this time period, video data of frame F8 up to frame F14 recorded on magneto-optical disc unit D1~magneto-optical disc unit D7 are stored into the buffer memory section 26. Then, such an operation is alternately repeated. Thus, video data of frame unit recorded on the disc unit section 28 are sequentially subjected to standard reproduction.

Figure 10:
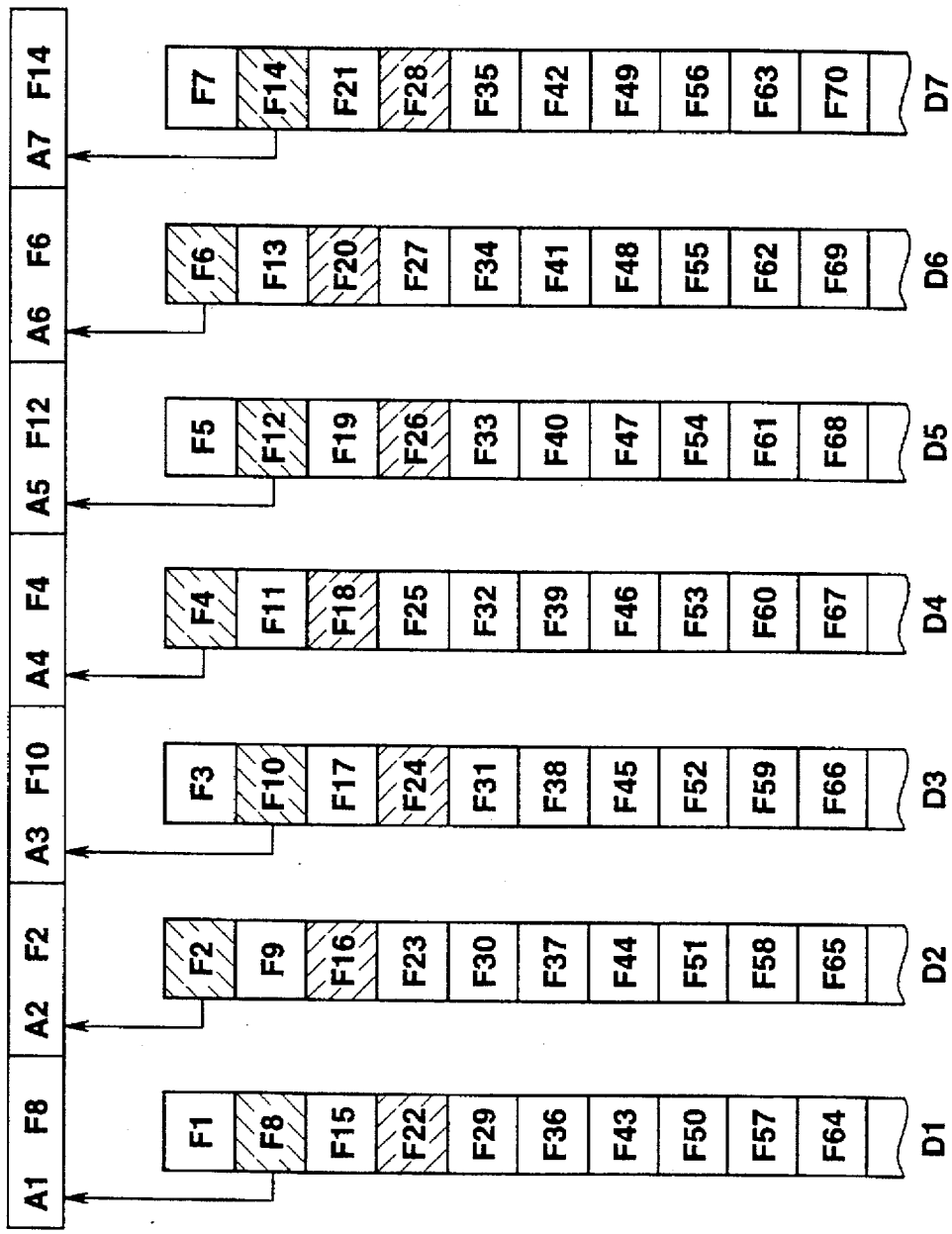
FIG. 10 is a view for explaining double speed reproduction operation that the Video On Demand system shown in FIG. 8 carries out.

Double speed reproduction will now be described with reference to FIG. 10.

In this case, the protocol controller 27 reads, from the magneto-optical disc units D1~D7, by control of the disc drive control section 5b, video data of frame unit of frame F8 recorded on magneto-optical disc unit D1, frame F2 recorded on magneto-optical disc unit D2, frame F10 recorded on magneto-optical disc unit D3, frame F4 recorded on magneto-optical disc unit D4, frame F12 recorded on magneto-optical disc unit D5, frame F6 recorded on magneto-optical disc unit D6, and frame F14 recorded on magneto-optical disc unit D7 to store those video data into predetermined areas A1~A7 of the buffer memory 26. When taking-in of data has been completed, the buffer memory 26 sends out, to the error check code adding/detecting section 25, the frame F2, the frame F4, the frame F6, the frame F8 and the frame F14 which have been selectively subjected to sequencing. For this time period, video data of frame F22 recorded on magneto-optical disc unit D1, frame F16 recorded on magneto-optical disc unit D2, frame F24 recorded on magneto-optical disc unit D3, frame F18 recorded on magneto-optical disc unit D4, frame F28 recorded on magneto-optical disc unit D5, frame F20 recorded on magneto-optical disc unit D6, and frame F28 recorded on magneto-optical disc unit D7 are stored into the buffer memory 26. After respective data are selectively subjected to sequencing, they are sent out to the error check code adding/detecting section 25 in order of frame F18, frame F18, frame F20, frame F22, frame F24, frame F28 and frame F28. By alternately repeating such an operation, video data of frame unit recorded at the disc unit section 28 are sequentially subjected to double speed reproduction.

Figure 11:
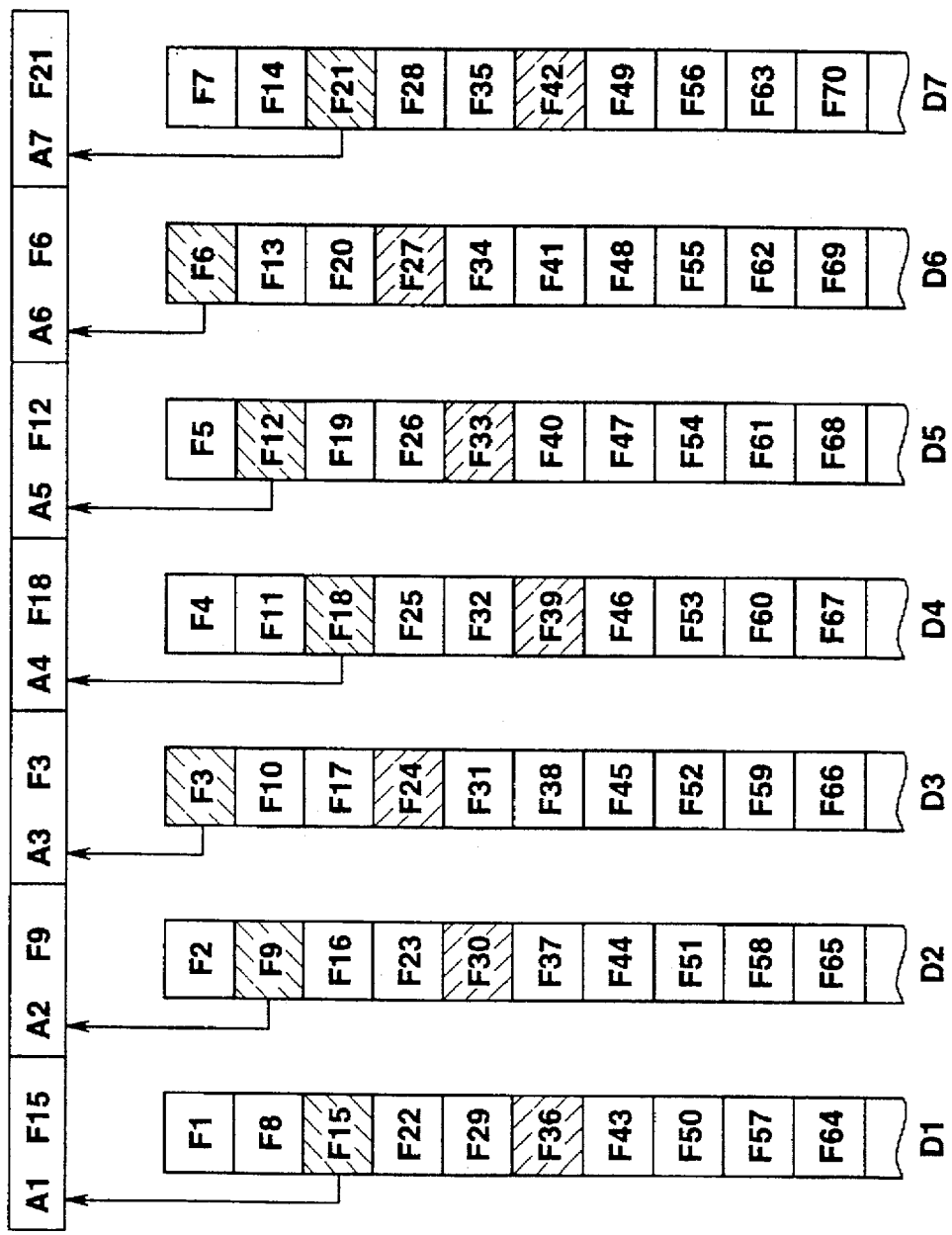
FIG. 11 is a view for explaining triple speed reproduction operation that the Video On Demand system shown in FIG. 8 carries out.

Triple speed reproduction will now be described with reference to FIG. 11.

In this case, the protocol controller 27 reads, from magneto-optical disc units D1~D7, by control of the disc drive control section 5b, video data of frame unit of frame F15 recorded on magneto-optical disc unit D1, frame F9 recorded on magneto-optical disc unit D2, frame F3 recorded on magneto-optical disc unit D3, frame F18 recorded on magneto-optical disc unit D4, frame F12 recorded on magneto-optical disc unit D5, frame F6 recorded on magneto-optical disc unit D6, and frame F21 recorded on magneto-optical disc unit D7 to store those data into predetermined areas A1~A7 of the buffer memory 26. When taking-in of data has been completed, the buffer memory 26 sends out, to the error check code adding/detecting section 25, the frame F3, the frame F6, the frame F9, the frame F12, the frame F15, the frame F18 and the frame F21 which have been selectively subjected to sequencing. For this time period, frame F36 recorded on magneto-optical disc unit D1, frame F30 recorded on magneto-optical disc unit D2, frame F24 recorded on magneto-optical disc unit D3, frame F39 recorded on magneto-optical disc unit D4, frame F33 recorded on magneto-optical disc unit D5, frame F27 recorded on magneto-optical disc unit D6, and frame F42 recorded on magneto-optical disc unit D7 are stored into the buffer memory 26. Then, after those data are selectively subjected to sequencing, they are sent out to the error check code adding/detecting section 25 in order of frame F24, frame F27, frame F30, frame F33, frame F36, frame F39, and frame F42. By alternately repeating such an operation, video data of frame unit recorded at the disc unit section 28 are sequentially subjected to triple (three times) speed reproduction.

As stated above, the VOD system which is the third embodiment employs a scheme to allow the number of magneto-optical disc units constituting the disc unit section to be set to 7 except for multiple of 2 and 3 to sequentially distribute video signals divided in frame units to seven magneto-optical disc units to record those signals therein, wherein in the case where these video signals are subjected to n times speed reproduction, video signals of the n frame interval are caused to undergo parallel reproduction through the protocol controller 27 from respective disc units D1~D7 of the disc unit section 28 to transfer reproduced data to the buffer memory 26 to send out a video signal of frame of n times speed from the buffer memory 28 to the error check code adding/detecting section 25, thus making it possible to efficiently carry out double speed reproduction or fast feed.

It should be noted that since the number of magneto-optical disc units of the disc unit section 28 is 7, it is impossible to carry out variable speed reproduction of multiple of 7 like 7 times speed or 14 times speed.

The VOD system may be of a structure in which, e.g., the disc drive section is composed of five magneto-optical disc units. In this case, it is possible to realize reproduction of double speed, triple speed and four times speed. Namely, it is sufficient to select, in dependency upon the specification required, the number of installation of disc units of the disc unit section so that it is equal to value except for multiple of 2 and 3, numbers except for multiple of 2 and except for multiple of 3, e.g., 5, 7, 11, 13, 17, 19 ... in a practical sense.

Moreover, while, in the case of triple speed reproduction, for example, reproduction is made in order of frame F3, frame F6, frame F9, frame F12 ..., reproduction may be made in order of frame F2, frame F5, frame F8, frame F11 ... This similarly applies to the case of double speed reproduction, four times speed reproduction, and five times speed reproduction. In addition, the disc unit constituting the disc unit section is not limited only to the magneto-optical disc unit, but may be hard disc unit.

Further, also with respect to video data recording/reproducing units 18 and 5 used in the video data processing system of the second embodiment and the VOD system of the third embodiment, at least one of plural magneto-optical disc units may be used for recording/reproduction of the error correction code.

Furthermore, video server system 11 including video data recording/reproducing unit 5 of the first embodiment, the video data input unit and the video data output unit may be used to constitute a video data processing system.

In addition, while video data file of one channel is assumed to be handled in the explanation of the variable speed reproduction processing of the VOD system of the third embodiment, the number of channels to be handled may be expanded to plural channels.

What is claimed is:

1. Apparatus for recording and reproducing information data to and from a recording medium, comprising:

input means for supplying said information data;

data compressing means for compressing said information data to generate compressed data;

input buffer means for temporarily storing the compressed data;

recording/reproducing means for recording the compressed data read out from the input buffer means onto a recording medium in a time divisional manner, and reproducing the compressed data recorded on the recording medium in a time divisional manner;

output buffer means for temporarily storing the compressed data reproduced by the recording/reproducing means;

data expanding means for expanding the compressed data read out from the output buffer means;

output means for outputting the data expanded by the expanding means; and control means for controlling read-out timing of the compressed data from the input buffer means and read-out timing of the compressed data from the output buffer means such that said recording/reproducing means continuously records and reproduces the information data to and from the recording medium simultaneously.

2. The apparatus as set forth in claim 1, further comprising dividing means for dividing the compressed data into multiple units of the compressed data; and wherein said recording/reproducing means includes a plurality of recording circuits, each recording and reproducing a respective unit of the compressed data.

3. The apparatus as set forth in claim 2, further comprising error correction code adding means for adding error correction code to the compressed data, and wherein at least one of the plurality of recording/reproducing circuits records and reproduces only the error correction code.

4. The apparatus as set forth in claim 1, wherein the input means includes a plurality of interface circuits, the data compressing means includes a plurality of compressing circuits for respectively compressing the information data from the plurality of interface circuits;

the input buffer means includes a plurality of input buffer circuits for respectively storing the compressed data compressed by the plurality of compressing circuits;

the recording/reproducing means includes a plurality of recording/reproducing circuits for recording and reproducing the compressed data; and the output buffer means includes a plurality of output buffer circuits for respectively temporarily storing the compressed data reproduced by the plurality of recording/reproducing circuits, and the apparatus further comprises distributing/gathering means connected to the plurality of input buffer circuits, the plurality of output buffer circuits and the plurality of recording/reproducing circuits for dividing the compressed data from one of the plurality of input buffer circuits into a plurality of units of compressed data, supplying the plurality of units of compressed data to the plurality of recording/reproducing circuits, and combining compressed data respectively reproduced from the plurality of recording/reproducing circuits to supply the combined compressed data to one of the plurality of output buffer circuits.

5. The apparatus as set forth in claim 2, wherein each recording/reproducing circuit is a disc unit adapted for recording the compressed data onto a disc shaped recording medium, and reproducing the compressed data from the disc-shaped recording medium.

6. The apparatus as set forth in claim 1, wherein the input means and the output means, the data compressing means and the data expanding means, and the input buffer means and the output buffer means can be used so that they are respectively selectively replace each other.

7. A system for processing information data, comprising:

at least one input unit for generating information data;

at least one output unit for outputting information data; and an information data recording/reproducing unit comprising data compressing means for compressing the information data supplied from the information data input unit to obtain compressed data, input buffer means for temporarily storing the compressed data obtained by the data compressing means, recording/reproducing means for recording the compressed data read out from the input buffer means onto a recording medium in a time divisional manner and reproducing the compressed data recorded on the recording medium in a time divisional manner, output buffer means for temporarily storing the compressed data reproduced by the recording/reproducing means, data expanding means for expanding the compressed data read out from the output buffer means, and control means for controlling read-out timing of the compressed data from the input buffer means and readout timing of the compressed data from the output buffer such that said recording/reproducing means continuously records and reproduces the information data to and from the recording medium simultaneously.

8. A system for processing information data, comprising:

at least one input unit for generating information data;

a data compressing unit for compressing the information data to generate compressed data;

an information data recording/reproducing unit comprising input buffer means for temporarily storing the compressed data, recording/reproducing means for recording the compressed data read out from the input buffer means onto a recording medium in a time divisional manner and reproducing the compressed data recorded on the recording medium in a time divisional manner, output buffer means for temporarily storing the compressed data reproduced by the recording/reproducing means, and control means for controlling read-out timing of the compressed data from the input buffer means and read-out timing of the compressed data from the output buffer means such that said recording/reproducing means continuously records and reproduces the information data to and from the recording medium simultaneously;

a data expanding unit for expanding the compressed data outputted from the information data recording/reproducing unit; and an output unit for outputting data expanded by the data expanding unit.

9. The system as set forth in claim 8, wherein the recording/reproducing means further includes dividing means for dividing the compressed data into multiple units of the compressed data and a plurality of recording/reproducing circuits, each recording and reproducing a respective unit of the compressed data.

10. The system as set forth in claim 9, wherein the information data recording/reproducing unit further includes error correction code adding means for adding error correction code to the compressed data, and at least one of the plurality of recording/reproducing circuits is operative to record and reproduce only the error correction code.

11. The system as set forth in claim 8, wherein the data compressing unit includes a plurality of compressing circuits;

the input buffer means includes a plurality of input buffer circuits for respectively storing the compressed data compressed by the plurality of compressing circuits;

the recording/reproducing means includes a plurality of recording/reproducing circuits for recording and reproducing the compressed data; and the output buffer means includes a plurality of output buffer circuits for respectively temporarily storing the compressed data reproduced at the plurality of recording/reproducing circuits, and further comprising distributing/gathering means connected to the plurality of input buffer circuits, the plurality of output buffer circuits, and the plurality of recording/reproducing circuits for dividing the compressed data from one of the plurality of input buffer circuits into multiple units of the compressed data, supplying the multiple units of compressed data to the plurality of recording/reproducing circuits, and combining compressed data respectively reproduced from the plurality of recording/reproducing circuits to supply the combined compressed data to one of the plurality of output buffer circuits.

12. The system as set forth in claim 8, wherein the input buffer means and the output buffer means can be used interchangeably.

13. The system as set forth in claim 8, wherein the recording/reproducing means includes plural number (except for multiple of 2 and 3) of recording/reproducing circuits; wherein said dividing means is operable to divide the compressed data into frame or field units; wherein the plurality of recording/reproducing circuits sequentially record said frame or field units of the compressed data; and wherein the plurality of units or n field units of the compressed data from the recording medium to provide reproduction at n times normal speed, where n is an integer.

14. The system as set forth in claim 9, wherein each recording/reproducing circuit is a disc unit adapted for recording the compressed data onto a disc-shaped recording medium, and reproducing the compressed data from the disc-shaped recording medium.

* * * * *